United States Patent
Keenan

[11] Patent Number: 6,051,048
[45] Date of Patent: Apr. 18, 2000

[54] PRODUCTION OF FUEL GAS

[75] Inventor: Brian Anthony Keenan, New Malden Surrey, United Kingdom

[73] Assignee: The BOC Group plc, Windlesham, United Kingdom

[21] Appl. No.: 09/099,092

[22] Filed: Jun. 17, 1998

[30]     Foreign Application Priority Data

Jun. 19, 1997 [GB] United Kingdom .................... 9712957

[51] Int. Cl.[7] .............................. C21B 11/02; C21B 13/02
[52] U.S. Cl. .................................. 75/492; 75/443; 75/494; 75/503; 75/958; 48/197 R
[58] Field of Search ...................... 266/156, 144; 75/503, 443, 958, 492, 494; 48/197 R

[56]           References Cited

U.S. PATENT DOCUMENTS 4,690,387   9/1987   Rockenschaub et al. .............. 266/144
5,413,622   5/1995   Greenwalt .
5,431,710   7/1995   Ebenfelt .................................... 75/443
5,855,631   1/1999   Leas ........................................ 48/197

FOREIGN PATENT DOCUMENTS

0384781A1   8/1990   European Pat. Off. .
2261225A   12/1993   United Kingdom .

*Primary Examiner*—Prince Willis
*Assistant Examiner*—Tima McGuthry-Banks
*Attorney, Agent, or Firm*—Salvatore P. Pace

[57]           ABSTRACT

A first, solid, carbon-containing fuel is gasified and iron is melted in a gasifier-melter. A first flow of resulting fuel gas is employed to form the iron in a vertical shaft furnace by direct reduction of iron ore. A second flow of resulting fuel gas is mixed with fuel gas produced by separately gasifying a second carbon-containing fuel in a second gasifier, in which no iron is melted and which supplies essentially no carbonaceous solid fuel to the first gasification stage. This mixing helps to dampen fluctuations in the flow rate of the second flow of the resulting fuel gas.

6 Claims, 1 Drawing Sheet

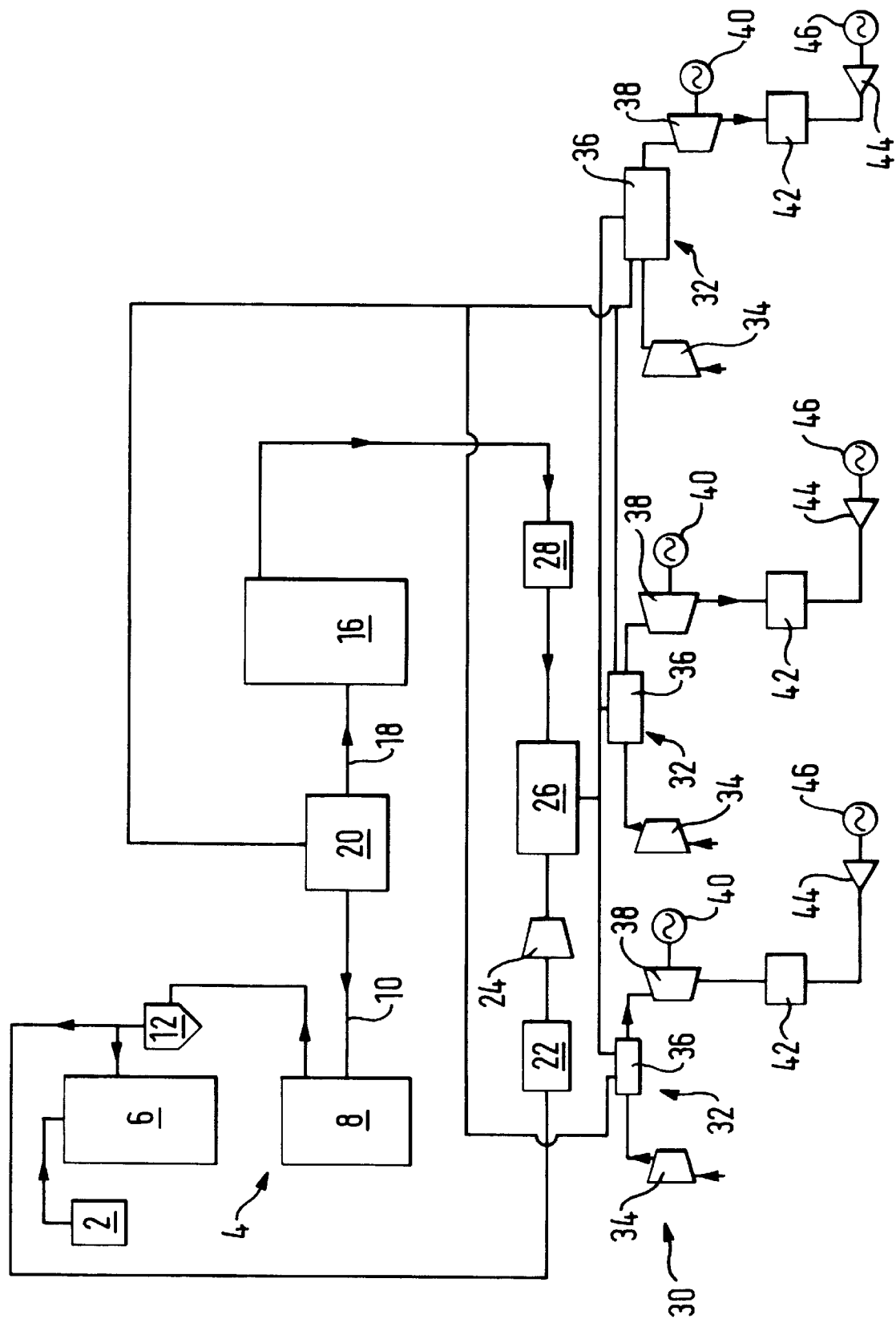

PRODUCTION OF FUEL GAS

BACKGROUND OF THE INVENTION

This invention relates to a method and apparatus for producing fuel gas.

Most of the world's iron production comes from blast furnaces. The primary function of a blast furnace is to reduce ore to iron. A charge comprising iron ore, coke and fluxing ingredients is introduced into the furnace through its top and forms a bed. A blast of pre-heated air is used to burn coke to form carbon monoxide. Carbon monoxide reduces the iron ore to iron. The heat liberated by the combustion of the coke is used to melt the iron produced. Iron and slag are removed as molten products at the bottom of the furnace. One disadvantage of this process is that it is necessary first to convert coal to coke. This operation is performed in a coke oven using a reducing atmosphere. Coke ovens are both expensive to run and produce residues which present problems when it comes to their disposal in an environmentally acceptable manner.

It is has therefore been proposed to produce iron from iron ore using coal directly. A two stage furnace is typically used. In an upper stage iron ore is reduced to iron by reaction with a reducing gas. The resulting iron is sent to a second stage in which it is melted. The second stage also serves to gasify coal via partial oxidation reactions so as to yield a reducing gas for use in the first stage. Such "direct reduction" processes have now come into commercial use.

One feature of direct reduction processes is that they generally produce reducing gas at a rate greater than that required for the reduction of the iron oxide. Since direct reduction processes are often operated at sites that are relatively remote from other industrial activity, it is typically uneconomic to collect the excess reducing gas and employ it as an industrial fuel at other sites. It is therefore often desirable to employ the fuel gas on site in the generation of electrical power. It has therefore been proposed to feed the fuel to a gas turbine forming part of a combined cycle power generator in which combustion of the fuel is performed at elevated pressure, the combustion gases are expanded in an expansion turbine, the hot exhaust gases from the expansion gases are heat exchanged with water or steam so as to form superheated steam, and the superheated steam is expanded in a steam turbine, with the expansion turbine and the steam turbine both being employed to drive alternators so as to generate electrical power. A disadvantage of this arrangement is that, in practice, the rate of production of the excess reducing gas tends to vary with changes in demand for iron from the direct reduction process. Such a variable flow of fuel gas is particularly disadvantageous in the generation of electrical power.

It is therefore an aim of the present invention to provide a method and apparatus which ameliorates the above difficulty.

EP-A-0 657 550 relates to a method for producing iron, comprising the steps of reducing iron ore to iron by reaction of a reducing gas in a first stage and melting the iron and gasifying a solid carbonaceous material both in a second stage, the gasification of the solid carbonaceous material yielding a reducing gas for use in the first stage, characterised in that at least 25% by weight preferably all of the carbonaceous material comprises particulate cold char formed by the partial oxidation of coal in a reactor separate from the first and second stages. This method enables a more thermally efficient process to be provided. In effect, the gasification of the coal is conducted in two separate steps, one being initial conversion of the coal to a char in the reactor, and the other being gasification of the char in the second stage. The rate at which excess reducing gas is produced is substantially unaffected by the addition of the reactor and therefore this method does not provide a solution to the above described problem.

SUMMARY OF THE INVENTION

According to the present invention there is provided a method of producing a fuel gas, comprising the steps of both gasifying a supply of first carbon-containing fuel and melting iron in a first gasification stage, supplying a first flow of resulting fuel gas to form by reduction of iron ore the iron to be melted, and mixing a second flow of resulting fuel gas with fuel gas produced by separately gasifying a supply of second carbon-containing fuel in a second gasification stage in which no iron is melted and which supplies essentially no carbonaceous solid fuel to the first gasification stage, wherein the first carbon-containing fuel is a solid carbonaceous fuel.

The invention also provides apparatus for producing a fuel gas, comprising a first gasifier for gasifying a supply of first carbon-containing fuel and melting iron, a furnace for forming by reduction of iron ore the iron to be melted, the furnace having an inlet for fuel gas communicating with an outlet for fuel gas from the first gasifier, a second gasifier for gasifying a supply of second carbon-containing fuel in the absence of molten iron, and a vessel for holding fuel gas communicating with an outlet for fuel gas from the first gasifier and an outlet for fuel gas from the second gasifier, the vessel having an outlet for the supply of a fuel gas mixture, wherein there is no means for supplying carbonaceous solid fuel from the second gasifier to the first gasifier.

By employing the second gasification stage, fluctuations in the rate of production of the fuel gas from the first gasification stage tend to be smoothed out. To achieve the best smoothing, the rate of export of gas from the second gasification stage is preferably greater than that from the first stage for mixing with this fuel gas from the first gasification stage.

The fuel gas mixture is preferably supplied to a combined cycle plant for producing electrical power and steam if required.

The first carbon-containing fuel is preferably coal. The second carbon-containing fuel is preferably coal (for example, coal fuels) but may alternatively be, for example, a heavy fuel oil. A further advantage of the method and apparatus according to the invention is that fine particles of coal which are unsuitable for use in the production of iron but which are inevitably formed in preparing coal for feeding to the first gasification stage may be readily gasified in the second gasification stage.

The second gasification stage is preferably operated at a higher pressure than the first gasification stage. Typically, the first gasification stage is operated at a pressure up to 30 bar and the second gasification stage at a pressure up to 80 bar.

The first and second gasifiers are preferably fed with oxygen directly from a common air separation plant. Nitrogen from the plant is preferably fed to at least one combustion chamber of at least one gasifier in which the fuel gas mixture is fully oxidised in the presence of air. The supply of such nitrogen helps reduce the formation of oxides of nitrogen. Further, the supply of nitrogen increases the recovery of power in the combined cycle.

BRIEF DESCRIPTION OF THE DRAWINGS

The method and apparatus according to the invention will now be described by way of example with reference to the accompanying drawing which is a schematic flow diagram of a combined gasification-iron production-power generation plant.

DETAILED DESCRIPTION

Referring to the drawing, run-of-mine coal is sent to a coal preparation plant 2 which comprises a wet grinding stage (not shown) and a screening stage (not shown). The wet grinding produces a range of different particle sizes, typically up to about 50 mm. The finest particles typically having a size less than about 10 mm are separated by screening. The remaining coal particles are passed to a two stage reactor 4 for operating a direct reduction process for producing iron from iron ore. The direct reduction process may for example be the COREX process. The reactor 4 comprises an upper vertical shaft furnace 6 and a lower melter-gasifier 8. Operation of the reactor 4 is conventional. In brief, measured quantities of lump, pelletised or sinter iron oxide ore, lime and dolomite are charged directly to the top of the furnace 6. Simultaneously, a reduction gas at elevated temperature comprising carbon monoxide and hydrogen is blown into the furnace 6 at an intermediate region thereof. The reduction gas moves upwards, against a descending flow of ore, to the top of the furnace 6 where it is drawn off. While descending through the hot gas, lime and dolomite are calcined and the ore is reduced to sponge iron. Screw conveyors (not shown) are typically employed to extract the sponge iron from the bottom of the shaft furnace 6 at a desired rate and the extracted sponge iron is allowed to fall under gravity directly into the gasifier-melter 8. The gasifier-melter 8 is of a kind having a hearth (not shown) at its bottom, a packed bed of coal (not shown), a fluidised bed (not shown) above the packed bed, and an uppermost free board zone (not shown). Oxygen or oxygen-enriched air is blown from a conduit 10 through tuyeres (not shown) into the fluidised bed region of the gasifier-melter 8 and coal is thereby gasified. The resulting reducing gas is withdrawn, is passed through a cyclone 12 in order to separate particulates therefrom, and is divided. Part of the divided flow provides a reducing gas for the furnace 6. Sponge iron falling under gravity into the fluidised bed region of the gasifier-melter 8 from the furnace 6 is melted. Liquid iron and slag, the latter comprising coal ash, lime and dolomite, drop into the hearth and separate naturally into two layers owing to the difference in density between the heavier iron and the lighter liquid slag. Liquid iron is withdrawn from the bottom of the gasifer-melter 8, as is the liquid slag.

The oxygen may be supplied directly from a plant for the separation of air. The plant may be of a kind in which the air is separated at cryogenic temperatures by fractional distillation in a rectification column. The oxygen may be taken from the rectification column either in vapour state, warmed to about ambient temperature, and compressed to the desired pressure, or in liquid state, raised to the desired pressure in a pump, vaporised, and warmed to about ambient temperature. Such plants are well known and can be arranged so as to give any desired oxygen purity.

A second supply of ground coal is fed to a second gasifier 16. The second gasifier 16 is typically of the partial oxidation kind typically but not necessarily employing water quenching, with either hot gas or cold gas clean up. The supply of fuel to the second gasifier 16 includes the fines from the coal preparation stage 2 associated with the furnace 4. Oxygen for use in the partial oxidation gas is supplied to the gasifier 16 via a conduit 18 at a pressure of about 70 bar. The oxygen is supplied to the gasifiers 8 and 16 from a common air separation plant 20. The oxygen is preferably from 85 to 95% pure but may be higher. The gasifier 16 typically produces a saturated fuel gas at a pressure of about 60 bar.

That part of the fuel gas produced in the first gasifier 8 which is not sent to the furnace 6 is taken from downstream of the cyclone 12 and is subjected to cleaning in a unit or units 22 of conventional kind for removing oxides of nitrogen from the gas. The cleaned fuel gas flows to a compressor 24 which may be of an axial or radial type, or have a combination of axial and radial stages, and which may be cooled or uncooled which raises its pressure to about 20 bar. The resulting compressed fuel gas is supplied to a storage vessel 26. The fuel gas formed in the gasifier 16 flows through a plurality of stages indicated generally in the drawing by the reference 28 which are effective to remove sulphur impurity from the gas and to recover power from it. A typical sequence of stages comprises a waste heat boiler (not shown), a phase separator for removing steam condensed in the waste heat boiler, a phase separator for separating resulting condensate from the fuel gas, further cooling and condensation stages, an acid gas removal unit, typically a Claus plant, a reheater, an expansion turbine which drives an alternator and therefore is able to generate electrical power and which reduces the pressure of the gas to about 20 bar, and a resaturator in which the gas is resaturated with water vapour. Such a series of stages is described in further detail in EP-B-0 384 781. The thus treated fuel gas is passed to the storage vessel 26, being either premixed with the fuel gas from the compressor 24 or mixed therewith in the vessel 26 itself.

The vessel 26 supplies with fuel gas combined cycle power recovery plant indicated generally by the reference numeral 30. The plant 30 comprises at least one gas turbine 32 comprising an air compressor 34, a combustion chamber 36 and an expansion turbine 38. The expansion turbine 38 is arranged to drive an alternator 40. The drawing shows three such gas turbines 32 arranged in parallel. In practice, any number may be used depending on the rate of production of the fuel gas mixture. Each combustion chamber 36 also receives a supply of nitrogen from the air separation plant 20. If the air separation plant does not produce the nitrogen at the pressure of the combustion chamber (typically about 20 bar), a compressor (not shown) may be employed to raise the nitrogen to the necessary pressure. Further, the nitrogen may, if desired, be saturated with water vapour and preheated to a temperature of at least 200° C. Passage of the nitrogen into the combustion chambers 36 helps to control the temperature therein and minimise the formation of oxides of nitrogen. In addition, the supply of nitrogen can enhance the power recovered. In addition, each gas turbine may have an independent fuel supply for start-up purposes.

The gas which exhausts from the expansion turbines 38 is relatively hot. It is therefore employed to raise steam in heat recovery steam generators 42. The resultant steam is expanded in steam turbines 44. The drawing shows three such turbines 44, but any number can be used depending on the amount of steam raised and whether any of the steam is exported for other uses. Each of the turbines 44 is associated with an alternator 46 so that further electrical power can be generated.

The relative rates of supply of fuel gas from the respective gasifiers 8 and 16 to the vessel 28 are arranged such that fluctuations in the rate at which iron ore is fed to the furnace 6 and hence in the rate at which reducing gas is required for use within the reactor 4 rather than for export have a minimum effect on operation of the power recovery plant 30 even during periods in which no iron is produced.

I claim:

1. A method of producing a fuel gas, comprising the steps of:

both gasifying a supply of first carbon-containing fuel to result in a first flow of fuel gas and a second flow of fuel gas and melting iron in a first gasification stage;

supplying said first flow of fuel gas to reduce iron ore to said iron; and mixing said second flow of fuel gas with fuel gas produced by separately gasifying a second carbon-containing fuel in a second gasification stage in which no iron is melted and which supplies essentially no carbonaceous solid fuel to the first gasification stage;

the first carbon containing fuel being a solid carbonaceous fuel.

2. The method as claimed in claim 1, in which the first carbon-containing fuel is coal.

3. The method as claimed in claim 1 or claim 2, in which the first carbon containing fuel comprises a relatively coarse fraction of coal particles formed by grinding coal, and the second carbon containing fuel includes a relatively fine fraction of coal particles formed by said grinding of coal.

4. The method as claimed in claim 1, in which the second carbon-containing fuel is coal.

5. The method in claim 1, wherein the first and second gasification stages are supplied with oxygen from a common air separation plant.

6. The method in claim 1, additionally including the step of supplying the fuel gas mixture to a combined cycle plant for the production of electrical power.

* * * * *